US008874910B2

(12) United States Patent
Liu

(10) Patent No.: US 8,874,910 B2
(45) Date of Patent: Oct. 28, 2014

(54) METHOD FOR IMPLEMENTING ENCRYPTION AND DEVICE THEREOF

(75) Inventor: Yonghua Liu, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 1812 days.

(21) Appl. No.: 11/922,973

(22) PCT Filed: Dec. 8, 2005

(86) PCT No.: PCT/CN2005/002125
§ 371 (c)(1),
(2), (4) Date: Apr. 13, 2011

(87) PCT Pub. No.: WO2007/003078
PCT Pub. Date: Jan. 11, 2007

(65) Prior Publication Data
US 2011/0185173 A1     Jul. 28, 2011

(30) Foreign Application Priority Data
Jun. 30, 2005   (CN) .......................... 2005 1 0080572

(51) Int. Cl.
*H04L 9/32* (2006.01)
(52) U.S. Cl.
CPC ........... *H04L 9/3226* (2013.01); *H04L 2209/60* (2013.01); *H04L 2209/80* (2013.01)
USPC ........... 713/168; 713/155; 713/158; 713/184; 713/186; 380/51; 380/54; 380/202
(58) Field of Classification Search
CPC .................................. G06F 15/16; H04L 7/00
See application file for complete search history.

(56) References Cited

U.S. PATENT DOCUMENTS 4,785,290 A * 11/1988 Goldman ..................... 340/5.86
5,926,549 A *  7/1999 Pinkas .......................... 713/168
6,819,766 B1   11/2004 Weidong
(Continued)

FOREIGN PATENT DOCUMENTS

DE   19811720 A1   9/1999
DE   10059066 A1   6/2002
(Continued)

OTHER PUBLICATIONS

"Adaptively-Secure, Non-Interactive Public-Key Encryption"—Canetti et al, Nov. 2004 http://eprint.iacr.org/2004/317.pdf.*
(Continued)

*Primary Examiner* — Randy Scott
(74) *Attorney, Agent, or Firm* — Patterson Thuente Pedersen, P.A.

(57) ABSTRACT

The present invention provides an encryption method in which the encryption device stores data to be encrypted received via the input/output interface in its own memory, converts the data to be encrypted in the memory into a format required by the output device and transmits the converted data to the output device via the management interface, and the output device outputs the received information. The present invention also provides an encryption device for implementing the above method. The encryption device determines whether confirmation information has been received from a management interface, encrypts the data to be encrypted in the memory if the answer is positive, while performs no encryption or prompting to input correct confirmation information if the answer is negative. With the present invention, the user is allowed to view the contents to be actually encrypted, thereby avoiding such a case as signature counterfeiting or tampering.

12 Claims, 2 Drawing Sheets

(56) References Cited

U.S. PATENT DOCUMENTS

| | | | |
|---|---|---|---|
| 2004/0128524 A1* | 7/2004 | Ezaki | 713/189 |
| 2004/0203594 A1* | 10/2004 | Kotzin et al. | 455/411 |
| 2005/0108548 A1* | 5/2005 | Ohta | 713/182 |
| 2006/0136633 A1* | 6/2006 | Harima et al. | 710/104 |

FOREIGN PATENT DOCUMENTS

| | | |
|---|---|---|
| JP | 9107352 | 4/1997 |
| JP | 2003110544 | 4/2003 |
| JP | 2004-110425 A | 4/2004 |
| WO | WO 00/39958 A1 | 7/2000 |

OTHER PUBLICATIONS

Ruland, C.: Sichere Übertragung und Archivierung elektronischer Dokumente, DATACOM, MBmedien GmbH, Krefeld, Mar. 1991, 8 pages.

* cited by examiner

METHOD FOR IMPLEMENTING ENCRYPTION AND DEVICE THEREOF

RELATED APPLICATIONS

This application claims priority to PCT Application No. PCT/CN2005/002125 filed Dec. 8, 2005, and Chinese Application No. 200510080572.6 filed Jun. 30, 2005, the disclosures of which are hereby incorporated by reference in their entireties.

FIELD OF INVENTION

The present invention relates to the field of information security technology, in particular to a method for implementing encryption and a device thereof.

BACKGROUND OF THE INVENTION

The network has prevailed in modern society. The popularization of network and e-commerce has given rise to the diversification of electronic encryption devices and systems, and various encryption methods are available currently, such as the electronic signature associated with the circulation of electronic documents, the professional certificate associated with network payment.

To facilitate the following description, several terms are first explained.

"Platform" means any product that comprises a device containing data processing capability, the device containing data processing capability can be one or more packaged or unpackaged integrated circuits. Instances of all kinds of platforms include, but are not limited to: a computer, such as Personal Digital Assistant (PDA), notebook computer, desktop computer, workstation and server; any peripheral devices associated with the computer, such as printer, digital camera and digital video camera; a wireless communication device, such as mobile phone, intelligent mobile phone; a network terminal, such as ATM, POS machine, KIOSK information query terminal; and a TV set-top box, etc.

"Link" is defined broadly as a channel for logic or physical communication, such as electrical wire, optical fiber, cable, bus (e.g., USB interface, 1394 interface, RS232 serial communication port, parallel printer port, internal LPC), PS2 interface, hard disk interface (ATAPI, SATA\SCSI), infrared/Bluetooth/Zigbee/WLAN, radio frequency (RF) or any other wireless channel of wireless signaling mechanism.

"Public network environment" refers generally to a situation where there exists an untrustworthy "link" with another platform and comprises, but is not limited to, a local area network such as an intra-corporation Ethernet and network in a net club, Internet such as logon by computer dialing at home and logon by ADSL/LAN/Cable, a mobile phone network such as GPRS/CDMA/3G, and a moment when Bluetooth/WLAN means is started on a platform.

On a "platform" in the "Public network environment", the predominant technique for an electron signature device used thereon focuses mainly on a smart card having a CPU. In general, the CPU-based smart card can support perfectly the technology of Public Key Infrastructure (PKI), and its security has been widely recognized and affirmed. Further, a security chip (TPM) in the computer also has a function similar to the smart card. Here, all devices having a chip based on a CPU smart card or TPM are generically called encryption devices.

Existing encryption devices often have two types of structures as shown in FIGS. 1 and 2.

FIG. 1 shows a schematic block diagram of a well-known encryption device in the prior art, which comprises at least an input/output interface 101 and an execution unit 102. The input/output interface 101 is an interface between the encryption device and a platform and is used to receive data to be encrypted from the platform and transmit the data to the execution unit 102, or it receives the encrypted data from the execution unit 102 and transmits the data to the platform. The execution unit 102 encrypts the received data. Generally, the execution unit 102 comprises an algorithm engine, a memory, a key-generating unit and a core processing unit having a RAM space. Obviously, the input/output interface 101 can receive a Personal Identification Number (PIN) from the platform and send the information to the execution unit 102. In this case, the execution unit 102 first verifies whether the PIN is legal, and encrypts the received data to be encrypted if it is legal, otherwise it conducts nothing or asks to input the correct PIN.

For example, the USBKey often used in daily life and the TPM mentioned in the Chinese Patent Application Publication No. CN1509546A, "Platform and Method for securely transmitting authorized data" are both embodied as the device shown in FIG. 1.

All control operations or steps are fulfilled on the platform when the device shown in FIG. 1 is used to perform encryption. In the existing public network environment, however, a hacker on the network can remotely monitor or record every action conducted on the platform, such as key input, handwriting input, voice input, on-screen display as well as all communication processes between platform and the encryption device. Furthermore, the hacker may manipulate surreptitiously your platform from a remote side. Since the control on signature action, i.e., encryption action, is completed on the platform, there is a high risk that the user's signature is counterfeited or tampered with during the process of connecting the encryption device to the platform, that is, inserting the encryption device into the platform.

FIG. 2 shows a schematic block diagram of another existing encryption device in the prior art. The existing encryption device comprises at least an input/output interface 101, an execution unit 102 and a management interface 201. The input/output interface 101 and an execution unit 102 have the exact same functions as those of the device in FIG. 1. The management interface 201 is primarily responsible for encryption control, in particular, it controls such that the encryption can be performed only when the execution unit 102 has received encryption control information from the management interface 201 and checked that the encryption control information is correct, otherwise the execution unit 102 does not conduct encryption. Here, the encryption control information can be fingerprint, level signal, password or the like. For example, in the Chinese Patent Application Publication No. CN0609069Y, "Fingerprint Digital Signature Device", an encryption device integrating a fingerprint sensor, a fingerprint identification device, an encryption device and a key generator together is proposed as an embodiment of the device shown in FIG. 2.

Although the encryption control information needs to be inputted to enhance the security in control operations when the device of FIG. 2 is applied to encryption, the case of counterfeiting or tampering the user's signature may occur due to the untrustworthy platform in the public network environment.

No matter which encryption device as described above is used, what the user views on the display of the platform is normally just inputted information other than the actual contents to be encrypted. In other word, although the data to be encrypted can be viewed on the platform, such data are just the data inputted via a device like a keyboard, and they may not be the same as those saved in the memory of the encryption device. This is because, before the actual encryption, the hacker may intercept the data for encryption inputted via the platform, abandon the data, replace the data with illegal data and store them in the memory of the encryption device. That is, the actual contents to be encrypted are lost. Therefore, the existing devices and methods cannot guarantee the definite security and reliability of the data to be encrypted and avoid the occurrence of such a case as signature counterfeiting or tampering.

SUMMARY OF THE INVENTION

In view of the above problems, the object of the present invention is to provide an encryption method which enables a user to view contents to be actually encrypted in addition to inputted information so as to ensure the security of the data to be encrypted and avoid the occurrence of signature counterfeiting or tampering. A further object of the present invention is to provide an encryption device for implementing the above encryption method.

In order to achieve the above object, according to one aspect of the present invention, an encryption method is provided applicable to an encryption device comprising an input/output interface, a management interface and an output device, the method comprises the following steps of:

a. storing, by the encryption device, data to be encrypted received via the input/output interface in a memory of the encryption device, converting the data to be encrypted in the memory into a format required by the output device, transmitting the converted data to the output device via the management interface and outputting the received information by the output device;

b. determining, by the encryption device, whether confirmation information has been received from the management interface, encrypting the data to be encrypted in the memory if the answer is positive, while performing no encryption or prompting to input correct confirmation information if the answer is negative.

In one embodiment, said output device outputs in the form of text, sound and/or image.

In one embodiment, said step of converting by the encryption device the data to be encrypted in the memory into a format required by the output device comprises converting part or all of the entire data to be encryption into a format required by the output device.

In one embodiment, the method further comprises the step of receiving, by said encryption device, a Personal Identification Number (PIN) from the input/output interface, determining whether the PIN is consistent with the pre-stored PIN, executing step a if they are consistent with each other, otherwise performing no encryption or prompting to input correct PIN.

In one embodiment, said confirmation information is a level signal, and said step of determining whether the confirmation information is legal comprises determining whether the received level signal is a preset high level or a low level.

In one embodiment, said confirmation information is a character string, and said step of determining whether the confirmation information is legal comprises determining whether the received character string is identical to the pre-stored character string or not.

In one embodiment, whether said confirmation information is legal is indicated by the status of a flag bit preset for representing whether said confirmation information is legal, and whether said encryption is completed is indicated by the status of a flag bit for representing whether said encryption is completed.

According to another aspect of the present invention, there is provided an encryption device comprising:

an input/output interface which receives data to be encrypted from a platform and transmits the data to an execution unit, or which receives the encrypted data from the execution unit and transmits the data to the platform;

an execution unit which receives and stores the data to be encrypted from the input/output interface, or which converts the stored data to be encrypted into a format required by an output device and transmits the converted data to the output device via a management interface, or which receives confirmation information from the management interface and encrypts the stored data to be encrypted after verifying the legality of the confirmation information;

a management interface which receives confirmation information from the outside and transmits the received confirmation information to the execution unit; and an output device which receives the data to be encrypted from the execution unit via the management interface and outputs the data.

In one embodiment, said output device is a display, a printer or a speaker or any combination of them.

In one embodiment, said display and/or speaker and/or printer contain a RAM unit.

In one embodiment, said input/output interface comprises, but is not limited to, serial port, parallel port, 1394 interface, USB interface, SIM card interface, IS014443 interface, ISO7816 interface, infrared interface, Bluetooth interface, Zigbee interface, WLAN interface, radio frequency (RF) interface or wireless channel interface of a wireless signaling mechanism.

In one embodiment, said management unit comprises, but is not limited to, serial port, parallel port, universal input/output signal interface or wireless interface.

According to one embodiment of the encryption method of the present invention, the encryption device stores data to be encrypted received via the input/output interface in its own memory, converts the data to be encrypted in the memory into a format required by the output device and transmits the converted data to the output device via the management interface, and the output device outputs the received information; the encryption device determines whether confirmation information has been received from the management interface, encrypts the data to be encrypted in the memory if the answer is positive, while performs no encryption or prompts to input correct confirmation information if the answer is negative. With the encryption method of the present invention, the user is allowed to view the contents to be actually encrypted, thereby avoiding such a case as signature counterfeiting or tampering. Further, the present invention provides an encryption device for implementing the above method. The present invention has a wide application to online transaction systems associated with bank and stock, e-payment password systems, documental electronic signature or mail signature systems, and it is secure and trustworthy to both the holder of the encryption device and the reception part of the encrypted information.

DETAILED DESCRIPTION

Now, the present invention will be further elaborated in connection with the figures.

Figure 1:
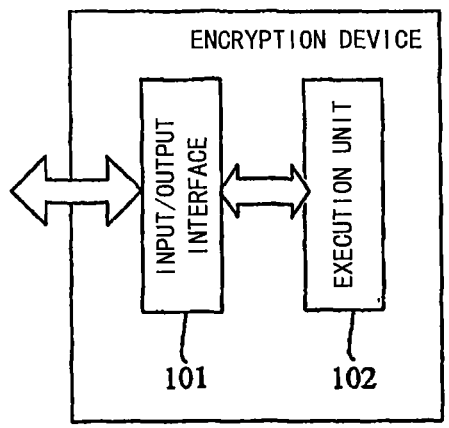
FIG. 1 shows a schematic block diagram of a well-known encryption device in the prior art.
Figure 2:
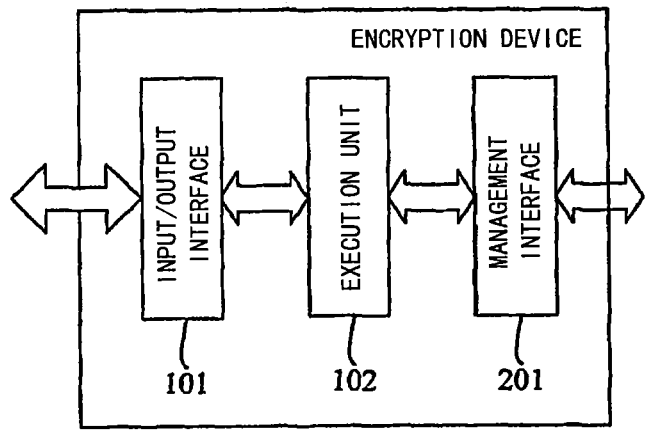
FIG. 2 shows a schematic block diagram of another well-known encryption device in the prior art.
Figure 3:
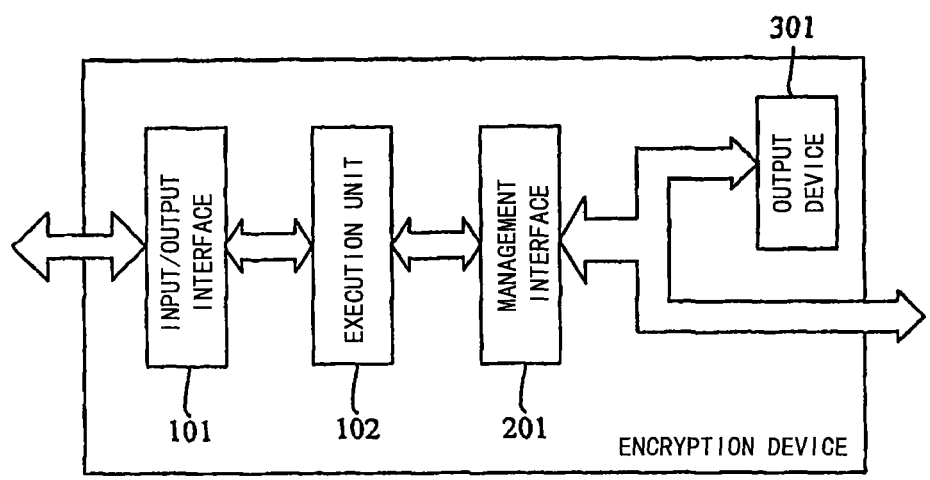
FIG. 3 shows a schematic block diagram of an encryption device according to one embodiment of the present invention.

FIG. 3 shows a schematic block diagram of an encryption device of one embodiment of the present invention. The encryption device of this embodiment comprises in addition to an input/output interface 101, an execution unit 102, a management interface 201 and an output device 301. The input/output interface 101 is configured to receive data to be encrypted from a platform and transmit the data to the execution unit 102, or it receives the encrypted data from the execution unit 102 and transmits the data to the platform.

The execution unit 102 is configured to receive and store the data to be encrypted from the input/output interface 101, or to convert the stored data to be encrypted into a format required by the output device 301 and transmit the converted data to the output device 301 via the management interface 201. Further, the execution unit 102 also receives the confirmation information from the management interface 201 and encrypts the stored data to be encrypted after verifying the confirmation information is legal. The encryption algorithm may be a public cipher algorithm such as RSA, an elliptical curve algorithm, a symmetrical cipher algorithm such as DES or AES, or a hash algorithm such as SHA 1, HMAC, or another such algorithm.

The management interface 201 may receive the confirmation information from external devices and transmit the received confirmation information to the execution unit 102.

The output device 301 may receive the data to be encrypted from the execution unit 102 and output the data.

Naturally, the input/output interface 101 can receive a PIN from the platform and send it to the execution unit 102. The execution unit 102 first checks whether the PIN is legal or not, and then encrypts the received data if it is legal, otherwise performs nothing or prompts to input the correct PIN.

The input/output interface 101 may comprise, but is not limited to, serial port, parallel port, 1394 interface, USB interface, SIM card interface, ISO1443 interface, ISO7816 interface, infrared interface, Bluetooth interface, Zigbee interface, WLAN interface, radio frequency (RF) interface or wireless channel interface of a wireless signaling mechanism. The management unit 201 may comprise, but is not limited to, serial port, parallel port, universal input/output signal interface or wireless interface.

The output device 301 may be a display, a printer or a speaker or any combination of them, and the display and/or speaker and/or printer can contain a RAM unit or not.

Next, the encryption method of the present inventive will be explained in detail with reference to FIG. 4.

Figure 4:
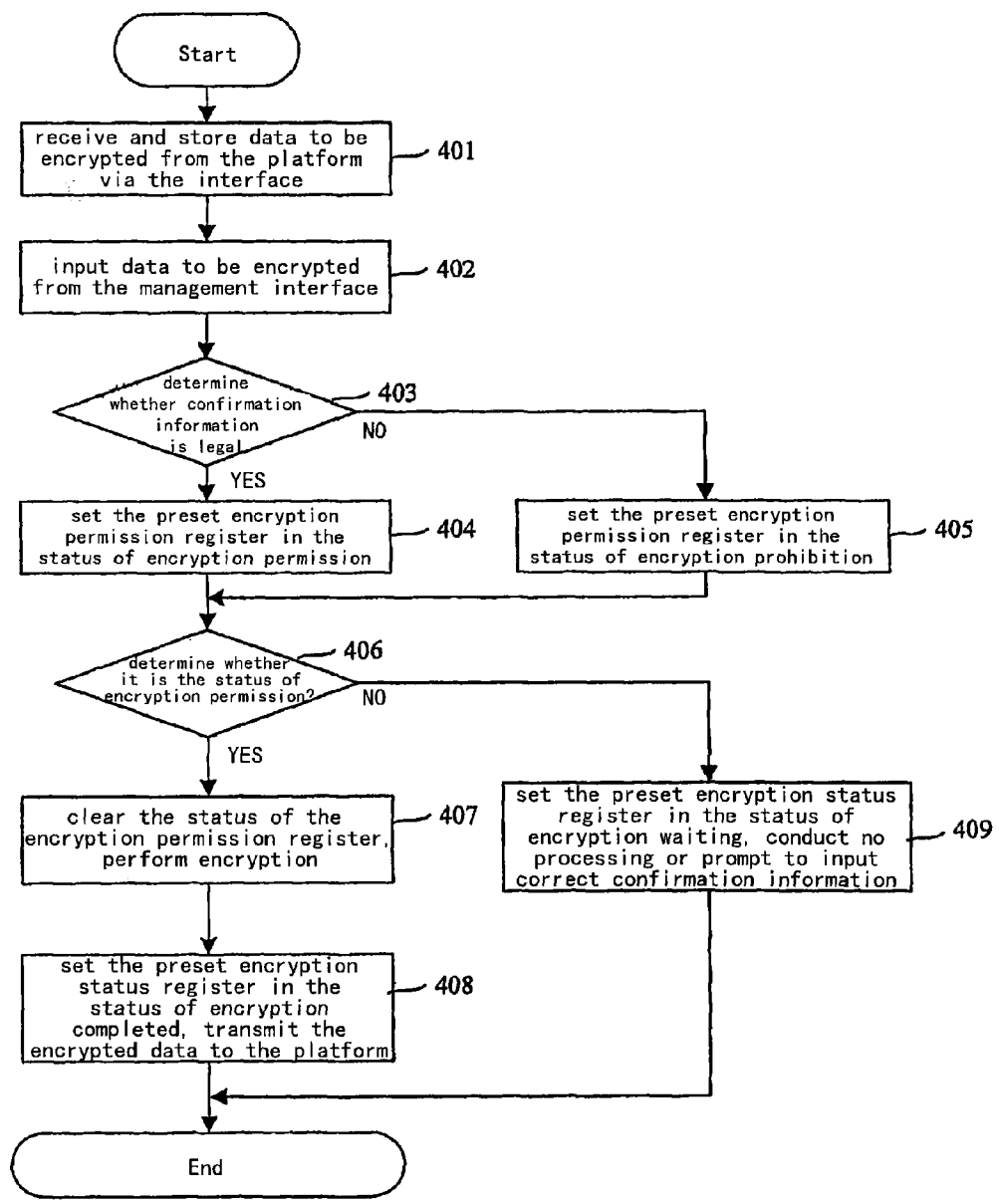
FIG. 4 shows a schematic flowchart for implementing an encryption method according to another embodiment of the present invention.

FIG. 4 shows a schematic flowchart for implementing the encryption method according to the embodiment of the present invention.

At step 401, the encryption device receives the data to be encrypted from the platform via the input/output interface and stores the data in its own memory. Here, the data to be encrypted is generally plain text.

At step 402, the encryption device converts the data to be encrypted stored in the memory into a format required by the output device and then transmits the converted data to the output device, which in turn output the received information. Here, the output device may output in the form of text, sound and/or image.

The procedure of the encryption device converting the data to be encrypted stored in the memory into a format required by the output device may convert the entire data to be encrypted into the format required by the output device. In this way, the output device displays the entire data to be encrypted. Alternatively, only a part of the entire data to be encrypted may be converted into the format required by the output device. In this case, the output device displays the part of the data to be encrypted. Which output approach is employed may depend on the presetting by the user, and which part of the data to be encrypted is outputted is determined by the preset requirement of outputting format.

At step 403, the encryption device receives confirmation information from the management interface, determines whether the confirmation information is legal or not. If the confirmation information is legal, the flow will proceed to step 404. If the confirmation information is not legal, the flow will proceed to step 405.

The legality of the confirmation information can be determined by setting a level signal. For example, assuming that a high level is set to represent the confirmation information is legal. Then, in determining the legality of the confirmation information, it is checked whether the received level signal is the preset high level, and the confirmation information is legal if the answer is YES, otherwise it is illegal. Obviously, a low level signal can also be set to represent that the confirmation information is legal, and the determination process is essentially the same as described above. In this case, the confirmation information is legal when the received level signal is the preset low level.

As an example, in any practical application, a button can be preset, and the level generated upon the pressed status of the button can be set as the confirmation information. In this way, step 404 can be executed only when the button is pressed. The encryption device can learn whether the button is pressed by determining whether the received level is the preset level or not. Obviously, some processing against jitter needs to be added in practice to solve the problem that the encryption would be repeated every time the button is pressed.

If the confirmation information is a character string, determining the legality of the confirmation information will comprise checking whether the received character string is identical to the character string pre-stored in the memory, and confirming its legality if they are identical, otherwise determining the confirmation information is illegal. It can be readily appreciated that the character string can be modified.

For example, in reality, a password input device can be preset, and a password can be preset in the memory of the encryption device as the confirmation information. In this way, step 404 can be executed only when the user has inputted the correct password, and the encryption device can learn the correctness of the password inputted by the user by checking whether the received password coincides with that pre-stored in the memory. Obviously, some processing against jitter needs to be added in practice to solve the problem that the encryption would be repeated every time the matching is performed.

At step 404, the flag bit, which is preset for representing whether the confirmation information is legal, is set in a status of encryption permission, and the flow proceeds to step 406. In the present embodiment, the flag bit for representing whether the confirmation information is legal is implemented by a register, and the status of the register is set as a status of encryption permission. Hereinafter, the register is called encryption permission register for clear description.

At step 405, the status of the preset encryption permission register is set as a status of encryption prohibition, and then the flow proceeds to step 406.

At step 406, the encryption device checks whether the status of the encryption permission register is in the status of encryption permission, and the flow goes to step 407 if it is, while the flow turns to step 409 if it is in the status of encryption prohibition.

At step 407, the status of the encryption permission register is cleared, that is, being set in the status of encryption prohibition. Then, the encryption device encrypts the stored data to be encrypted.

Here, the encryption algorithm can be a public cipher algorithm such as RSA, an elliptical curve algorithm, a symmetrical cipher algorithm such as DES or AES, or a hash algorithm such as SHA1, HMAC or another such algorithm.

At step 408, after completing the above encryption, the flag bit, which is preset for representing whether the encryption process is completed, is set in a status of encryption completed, and then the encrypted data is transmitted to the platform. So far the flow is ended.

In the present embodiment, the flag bit for representing whether the encryption process is completed is implemented with a further register. That is, the status of this register is set as the status of encryption completed. Hereinafter, the register is called encryption status register for clear description.

At step 409, the preset encryption status register is set in a status of encryption waiting. Thereafter, the device enters the standby status or prompts to input the correct confirmation information.

In other words, when the execution unit in the encryption device detects the status of the encryption permission register is the status of encryption permission, it sets the encryption permission register in the status of encryption prohibition, encrypts the data, and sets the encryption status register in the status of encryption completed after the completion of encryption. On the other hand, the execution unit in the encryption device sets the encryption status register in the status of encryption waiting when it detects that the status of the encryption permission register is the status of encryption prohibition.

Naturally, no flag bit needs to be set in the above flow, and the execution unit in the encryption device can encrypt the received data to be encrypted as long as it detects that the confirmation information is legal, and conducts no action or prompt to input the correct confirmation information when the confirmation information is detected as illegal. Accordingly, no register needs to be set when the encryption process is completed.

Moreover, a PIN can be set in the memory of the encryption device in advance, and the encryption device first receives the PIN from the input/output interface, then checks for consistency between the received PIN and the pre-stored PIN. Step 401 is executed if the consistency holds. Otherwise, the encryption device has no action or prompt to input the correct PIN.

It should be understood that, to those ordinarily skilled in the art, various improvements and modifications to the foregoing description can be made within the principle of the present invention and should be encompassed by the scope of the present invention.

What is claimed is:

1. An encryption method for an encryption device including an input/output interface, an execution unit, a management interface and an output device, the method comprising the steps of:

a. receiving, by the execution unit, data to be encrypted via the input/output interface, storing the data to be encrypted in a memory of the execution unit, converting the stored data to be encrypted into a converted format as required by the output device, forwarding the converted format to the output device via the management interface, and providing, by the output device, the converted format to a user to review what will be encrypted;

b. receiving confirmation information through the management interface after determining the converted format is the content to be encrypted so as to allow the execution unit to encrypt the stored data to be encrypted; and c. encrypting, by the execution unit, the stored data to be encrypted after receiving the confirmation information, otherwise, prompting to input correct confirmation information.

2. The method according to claim 1, wherein said output device outputs the converted format in the form of text, sound and/or image.

3. The method according to claim 1, wherein said step of converting by the execution unit the data to be encrypted into the converted format as required by the output device comprises converting a part or all of the data to be encrypted into the converted format.

4. The method according to claim 1, further comprising the step of receiving, by said encryption device, a Personal Identification Number (PIN) from the input/output interface, determining whether the received PIN is consistent with the pre-stored PIN, executing the step a if they are consistent with each other, otherwise performing no encryption or prompting to input correct PIN.

5. The method according to claim 1, wherein said confirmation information is a level signal, and further comprising a step of determining whether the received level signal is the preset high level or low level.

6. The method according to claim 1, wherein said confirmation information is a character string, and further comprising a step of determining whether the received character string is identical to the pre-stored character string.

7. The method according to claim 1, wherein whether said correct confirmation information is indicated by the status of a flag bit preset for representing whether said confirmation information is legal, and whether said encryption is completed is indicated by the status of a flag bit for representing whether said encryption is completed.

8. An encryption device, comprising:

an input/output interface for receiving data to be encrypted from a platform and transmitting the received data to an execution unit, or receiving the encrypted data from the execution unit and transmitting the data to the platform;

an execution unit for receiving the data to be encrypted from the input/output interface, storing the data to be encrypted in a memory, converting the stored data to be encrypted into a converted format as required by an output device and transmitting the converted format to the output device via a management interface, and encrypting the stored data to be encrypted after receiving confirmation information from the management interface and performing no encryption or prompting to input correct confirmation information if the confirmation information is not received;

a management interface for forwarding the converted format to the output device, and receiving the confirmation information input from outside and forwarding the received confirmation information to the execution unit; and an output device for receiving the converted format converted by the execution unit and providing the converted format to a user to review what will be encrypted, wherein the confirmation information is received through the management interface after determining the converted format is the contents to be encrypted.

9. The device according to claim 8, wherein said output device is a display, a printer or a speaker or any combination of the display, the printer, and the speaker.

10. The device according to claim 9, wherein said display and/or speaker and/or printer contain a RAM unit.

11. The device according to claim 8, wherein said input/output interface comprises a serial port, parallel port, 1394 interface, USB interface, SIM card interface, ISO14443 interface, ISO7816 interface, infrared interface, Bluetooth interface, Zigbee interface, WLAN interface, radio frequency RF interface or wireless channel interface of a wireless signaling mechanism.

12. The device according to claim 8, wherein said management interface comprises a serial port, parallel port, universal input/output signal interface or wireless interface.

\* \* \* \* \*